United States Patent [19]
MacNeill et al.

[11] 3,777,417
[45] Dec. 11, 1973

[54] SOUND TEACHER

[75] Inventors: John H. MacNeill, Indialantic; James E. Bellinger, Melbourne; Harrison B. Lidkea, Satellite Beach; Kenneth L. Seib, Indian Harbor Beach, all of Fla.

[73] Assignee: Educational Sound Systems, Inc., Melbourne, Fla.

[22] Filed: Apr. 28, 1971

[21] Appl. No.: 138,249

[52] U.S. Cl.. 35/35 C, 179/100.2 MD, 179/100.2 S
[51] Int. Cl. ............................. G09b 5/04, G11b 5/02
[58] Field of Search .................... 35/35 C, 8 A, 9 A; 179/100.1 VC, 100.2 MD, 100.2 S

[56] References Cited
UNITED STATES PATENTS

| | | | |
|---|---|---|---|
| 3,234,666 | 2/1966 | Cooper | 35/35 C |
| 3,405,238 | 10/1968 | Hurvitz | 35/35 C X |
| 3,596,378 | 8/1971 | Flubacher | 35/35 C |
| 3,323,230 | 6/1967 | Cooper | 35/35 C |
| 3,156,052 | 11/1964 | Irazoqui | 35/35 C |
| 2,606,253 | 8/1952 | Somers | 179/100.1 VC |
| 3,505,485 | 4/1970 | Andrews | 179/100.1 VC |

Primary Examiner—William H. Grieb
Attorney—Rose & Edell

[57] ABSTRACT

A sound teacher includes a master tape on which individual spaced segments are recorded and a student tape on which a student can record and immediately play back his recording after heating a master tape segment. In one operational mode a selectively actuable pause switch permits the master tape to stop after each master segment is played to permit the student to record or not; in another mode, the master tape stops after a segment, reverses while the student records and listens to his recording, and then replays the master segment and continues on to play the next segment; in still another mode the pause switch causes the master tape to stop after alternate segments to permit the student to record or not. Provision is made for automatically inserting the proper spacing between master tape segments recorded either locally or from some remote location, unintended gaps within a segment being automatically eliminated. In addition, provision is made to permit the student to reverse the master tape through any selected number of master tape segments.

16 Claims, 6 Drawing Figures

INVENTORS
JOHN H. MacNEILL,
JAMES E. BELLINGER,
HARRISON B. LIDKEA
& KENNETH L. SEIB

By Rose & Edell
ATTORNEYS

INVENTORS
JOHN H. MacNEILL,
JAMES E. BELLINGER,
HARRISON B. LIDKEA
& KENNETH L. SEIB

By Rose & Edell
ATTORNEYS

SOUND TEACHER

BACKGROUND OF THE INVENTION

The present invention relates generally to sound teaching machines of the type which can be readily employed as language trainers, and more particularly to such machines which employ separate student and master tapes. The present invention utilizes some of the basic concepts disclosed in U.S. Pat. No. 3,323,230 to Cooper and provides significant improvements and advantages over the Cooper apparatus.

In the language teacher disclosed by Cooper a master tape is provided on which a series of spaced segments are recorded. An endless student tape is also provided and is transferred from a storage bin to a transient bin while the student records and immediately back to the storage bin while the student listens to his recording. The student is thus able to listen to master tape segments, actuate a talk switch which permits him to record his version of the master tape segments, immediately hear the recording of his version, and once again listen to the master tape segment to compare his recording to that on the master tape. This sequence of "listen-record-compare", controllable by the actuation of a single switch by the student, has proven to be highly efficient in teaching languages. For example, a foreign language word or phrase may be played on a master tape, recorded on the student tape and immediately played back from the student tape, and then the master tape segment may be repeated to permit the student to immediately compare his pronunciation with the proper pronunciation recorded on the master tape. This listen-record-compare sequence is also extremely valuable in speech therapy environments, particularly for laryngectomy patients.

A practical disadvantage of the Cooper machine relates to the fact that upon termination of each master tape segment the student must quickly actuate the talk switch to prevent the master tape from proceeding on to the next segment; but upon actuating the talk switch the student must be ready to repeat the master segment word or phrase because the student tape immediately begins recording. It is desirable to permit the student, particularly the beginning student, to operate the machine in a mode whereby the master tape automatically stops after playing a recorded segment which is to be repeated by the student, thereby giving the student a short period of time to formulate his thoughts before having to record his response.

It is therefore an object of the present invention to provide a machine of the type described whereby the master tape may be automatically stopped after playing a segment which is to be repeated by the student.

Another disadvantage of the Cooper machine relates to its inability to permit the master tape to be changed without removing the master tape from the machine. Even if one were to add a record head for the master tape in the Cooper machine, direct recording onto the tape would be impractical since there would be no way to assure that each master tape segment is properly spaced from preceding and succeeding segments, and that no confusing gaps are provided within each master tape segment. Moreover, it is highly desirable to permit one or more machines to have their master tape contents changed from a common remote location, such as in a language laboratory where a teacher at a master console desires control over multiple student machines for the purpose of chaning the lesson on the master tape from day-to-day or week-to-week.

It is therefore an object of the present invention to provide a machine of the type described which includes provision for permitting both remote and local recording on the master tape and wherein unintended gaps in a master tape segment are automatically deleted. It is a further object of the present invention to provide a machine of the type described wherein the master tape may be recorded upon from both local and remote locations and wherein individual master tape segments are automatically spaced by a predetermined distance along the tape.

Another practical disadvantage of the Cooper machine resides in the fact that a student is unable to return directly to a master tape lesson segment which he has already passed. For example, if the student proceeds through six master tape segments, following the listen-record-compare sequence for each, and then desires to go back directly to lesson segment two on the master tape, he must do so by trial and error. In other words, using the Cooper machine, the student must rewind the tape and then listen to determine if he has rewound the tape far enough; by this trial and error method he will eventually get to the desired second tape segment.

It is therefore another object of the present invention to provide in a machine of the type described a provision which permits the student to count the number of lesson segments as the master tape rewinds.

SUMMARY OF THE INVENTION

In accordance with the present invention a sound teaching machine having a master tape and a student tape is provided with a selectively actuable pause switch and a plurality of mode selection switches. The pause switch, when actuated, causes the master tape to stop after one or more master segments are played, the number of segments depending upon which mode selection switch is actuated. Stopping of the tape is achieved by a gap detector circuit which responds to the absence of recorded audio on the master tape for approximately one second by actuating a pinch roller to terminate master tape forward drive. In addition the machine may be provided with local and/or remote record capability whereby the master tape may be recorded upon with new lesson material and each lesson segment is automatically spaced by a little more than one second in time. Moreover, circuitry is provided to prevent unintended gaps within a recorded segment by means of a circuit which detects the presence of input audio during the master tape record mode. If input audio is absent for approximately three-fourths of a second the master tape is stopped until audio is once again detected. Only when the person recording on the master tape releases the record switch will the segment be terminated and a proper one second or greater space be provided on the master tape. As a further feature a repeat switch is provided which is momentarily actuated to cause the master tape to reverse until a gap of one second or greater is detected. Upon detection of such a gap, reversing is terminated and the student can re-initiate reversing by once again momentarily actuating the repeat switch. By counting the number of times reversing stops, or likewise counting the number of times he must momentarily actuate the repeat switch, the student is able to count master tape segments backwards to properly position the master tape at a previously recorded segment.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF PREFERRED EMBODIMENT

Figure 1:
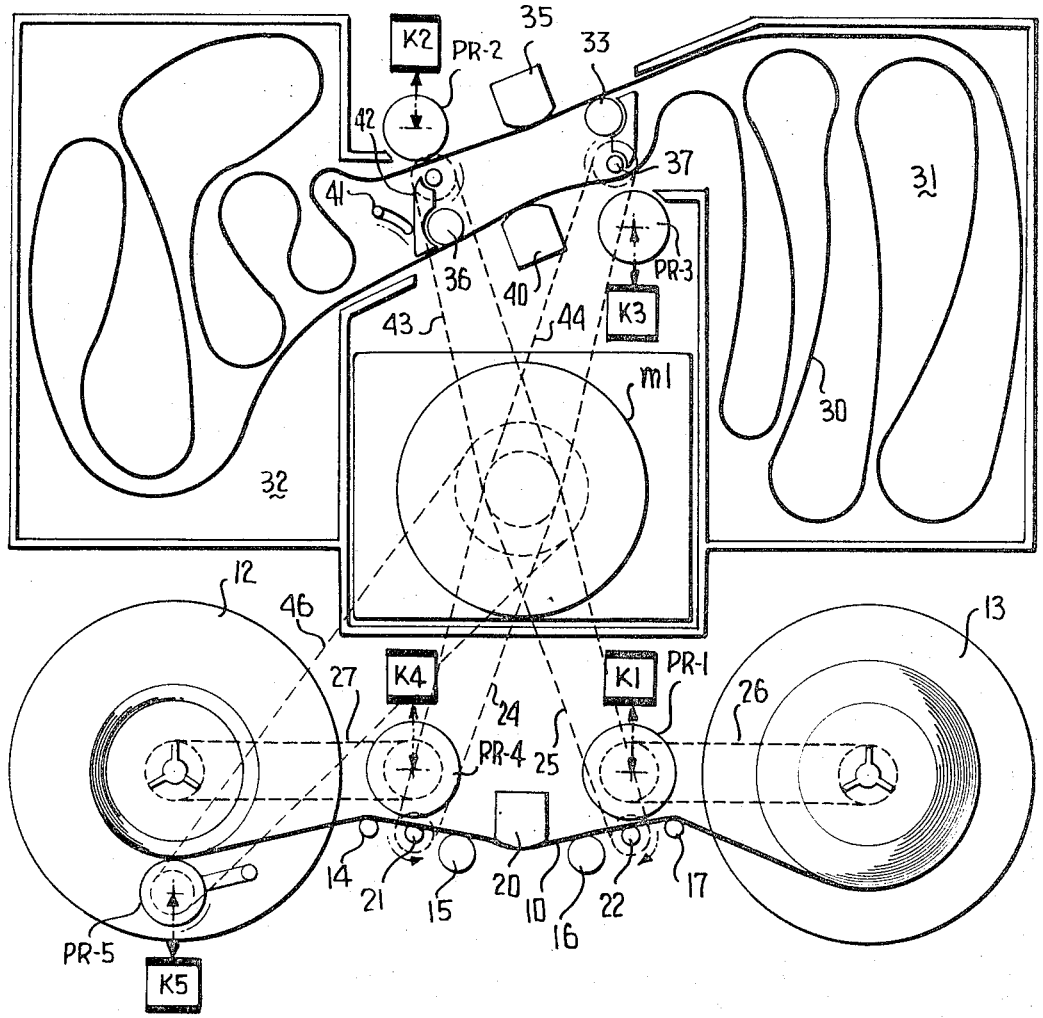
FIG. 1 is a diagrammatic representation of the mechanical operation of a preferred embodiment of the present invention.

Referring specifically to FIG. 1 of the accompanying drawings, a master tape 10 is stored on storage reel 12 and extends to take up reel 13. The path between storage reel 12 and take up reel 13 is determined by tape guides 14, 15, 16 and 17 disposed between the reels. Between guides 15 and 16 there is disposed a master tape record/playback head 20 across the face of which master tape 10 is constrained to pass.

A reverse capstan 21 is located between tape guides 14 and 15, normally out of contact with master tape 10. A forward capstan 22 is located between tape guides 16, 17 and is also normally out of contact with master tape 10. Capstans 21 and 22 are continuously rotated by motor M1 through belts or linkages diagrammatically represented at 24 and 25, respectively. A master forward pinch roller PR-1 is selectively displaceable by solenoid or relay K1 to engage master tape 10 between the rims of pinch roller PR-1 and capstan 22. When so engaged master tape 10 is pulled from supply reel 12 and driven toward take up reel 13. Pinch roller PR-1 is linked to take up reel 13 by means of belt or pulley 26, whereby the take up reel is driven to receive the master tape whenever pinch roller PR-1 is displaced toward capstan 22.

A master reverse pinch roller PR-4 is selectively displaceable by solenoid K4 to engage master tape 10 between the rims of pinch roller PR-4 and capstan 21. When so engaged the master tape is pulled from take up reel 13 and driven toward storage reel 12. A belt or pulley 27 couples storage reel 12 to pinch roller PR-4 whereby the storage reel is driven to receive the master tape whenever the master reverse pinch roller PR-4 is displaced toward capstan 21.

The master tape 10 may be rewound at high speed onto storage reel 12 by actuating solenoid K5 to displace pinch roller PR-5 into rim-drive engagement with the storage reel. Pinch roller PR-5 is driven by motor M1 via linkage 46.

An endless student tape 30 is normally stored in storage bin 31. When so stored a portion of the student tape loops outside storage bin 31 into transient bin 32 and back into storage bin 31. This portion of the tape follows a path defined by a tape guide 33 (at the exit of storage bin 31), student record head 35, student record capstan 34, guide wall 42 extending between the entrance and exit of transient bin 32, tape guide 36, student playback head 40, student playback capstan 37 and the entrance to storage bin 31. This portion of the student tape is taut and therefore actuates a taut tape switch 41, located in bin 32, by pulling its actuating lever toward guide wall 42.

The actuating lever of taut tape switch 41 is spring biased away from guide wall 42, whereby the lever is released when the tape in transient bin 32 is not taut.

Student record capstan 34 is continuously driven by motor M1 via linkage 43; student playback capstan 37 is continuously driven by motor M1 via linkage 44. Student tape 30 is delivered to transient bin 32 when solenoid K2 is actuated to displace student record pinch roller PR-2 toward capstan 34. This displacement engages the student tape between the rims of pinch roller PR-2 and capstan 34 to pull the tape from supply bin 31 across student record head 35. Student tape is delivered from transient bin 32 to storage bin 31 when solenoid K3 is actuated to displace student playback pinch roller PR-3 toward capstan 37. This displacement engages the student tape between the rims of pinch roller PR-3 and capstan 37 to pull the student tape from the transient bin across student playback head 40.

Figure 2:
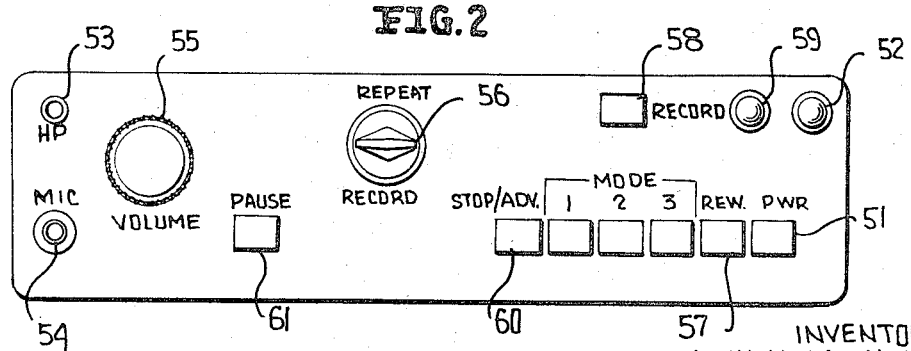
FIG. 2 is a plan view of a control panel for the embodiment of FIG. 1.

In FIG. 2 of the accompanying drawings there is illustrated a control panel for the sound teacher machine of FIG. 1. The various controls on the panel and their functions are described briefly below. A more detailed functional description is later provided with reference to FIGS. 3a and 3b. The panel includes a PWR push button switch which is operative when depressed to apply appropriate voltages to the machine components. A red lamp 52 is energized whenever the PWR switch is depressed. Headset jack 53 and microphone jack 54 are adapted to receive corresponding loud speaker and microphone plugs which permit the student to communicate with the sound teacher. A rotatable volume control knob 55 adjusts the audio output level from both the student and master tapes.

A three position RECORD/REPEAT switch 56 is spring biased to its off (horizontal) position. When pressed up to its repeat position switch 56 causes the master tape to move backward onto its storage reel. If pressed up only momentarily, the master tape moves backward until a gap (i.e., no audio recording) is sensed on the master tape. When switch 56 is pressed down, the student tape is driven into transient bin 32 (FIG. 1) and all sounds picked up by the microphone (not shown) plugged into jack 54 are recorded on the student tape. The student is thus permitted to record whenever switch 56 is pressed down. Upon release of switch 56 any student tape in the transient bin is returned to supply bin 31 and the student's recording is played back in the process.

A REW switch 57, when depressed, causes the master tape to rewind at high speed onto storage reel 12. A record switch 58 permits recording on the master tape when depressed, recording being effected via the student's microphone and jack 54. Depression of switch 58 also lights indicator lamp 59. A STOP-ADV switch 60 stops the master tape when held depressed. If the master tape has halted during any mode of operation, momentary actuation of switch 60 causes the tape to advance.

Figure 5:
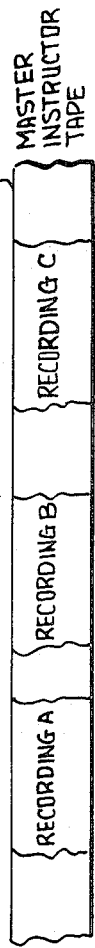
FIG. 5 is a diagrammatic representation of a section of master tape employed with the preferred embodiment of the present invention.

Three MODE switches, 1, 2 and 3, are actuable one at a time to determine the operation mode of the machine. These switches co-operate with PAUSE switch 61 in controlling the operating modes. To illustrate the various operating modes, reference is made to FIG. 5 in which a section of master tape 10 is illustrated there being successive segments A, B and C recorded thereon and separated by gaps of one second or more. In the preferred embodiment described herein, mode 1 is for repetition drills. When the mode 1 switch is depressed, the master tape plays one segment, for example, A, after which the master tape stops if PAUSE switch 61 is depressed. The student can then record by depressing switch 56 and then automatically hear his recording by releasing switch 56. The master tape is reversed by one segment during student record and playback so that master segment A may be automatically repeated for comparison purposes after the student's recording is played back. The master tape does not stop automatically after repeating the segment A, even though the PAUSE switch is depressed; rather, if the student chooses not to record A again himself, the master tape continues on to playback the segment B and stops.

Mode 2 is for problem drills. In this mode, segment A is played and if the PAUSE switch is depressed the master tape stops. The student then records and immediately plays back his speedh which in this mode is intended to sound like segment B. Master tape segment B is played immediately following the student's recording and the master tape continues on to playback segment C and stops.

In mode 3, assuming the PAUSE switch is depressed, the master tape always stops at every gap of one second or more. This mode is also for problem drills but requires a master tape in which problem answers are immediately followed by the next question without a gap. In this mode half of the control gaps may be eliminated on the master tape, thus permitting more problems to be recorded per reel of tape than in mode 2.

If PAUSE switch 61 is not depressed, modes 1, 2 and 3 differ from those described only in that the master tape does not stop its forward feed automatically when a gap is detected. Instead, the student must stop the master tape by actuating RECORD/REPEAT switch 56.

Figure 3A:
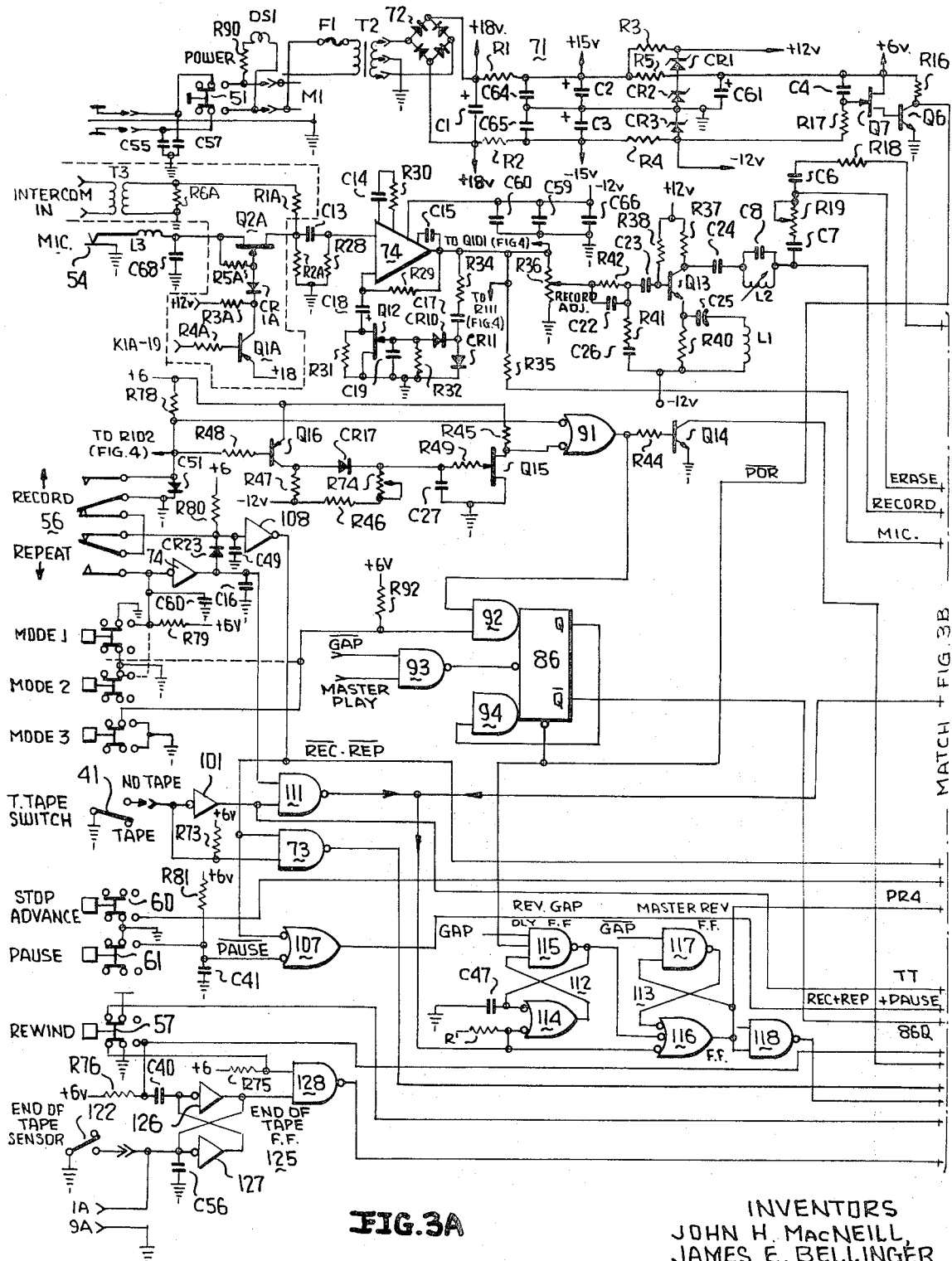
FIGS. 3a and 3b together comprise a schematic diagram of the electrical circuits employed to control the preferred embodiment of the present invention.
Figure 3B:
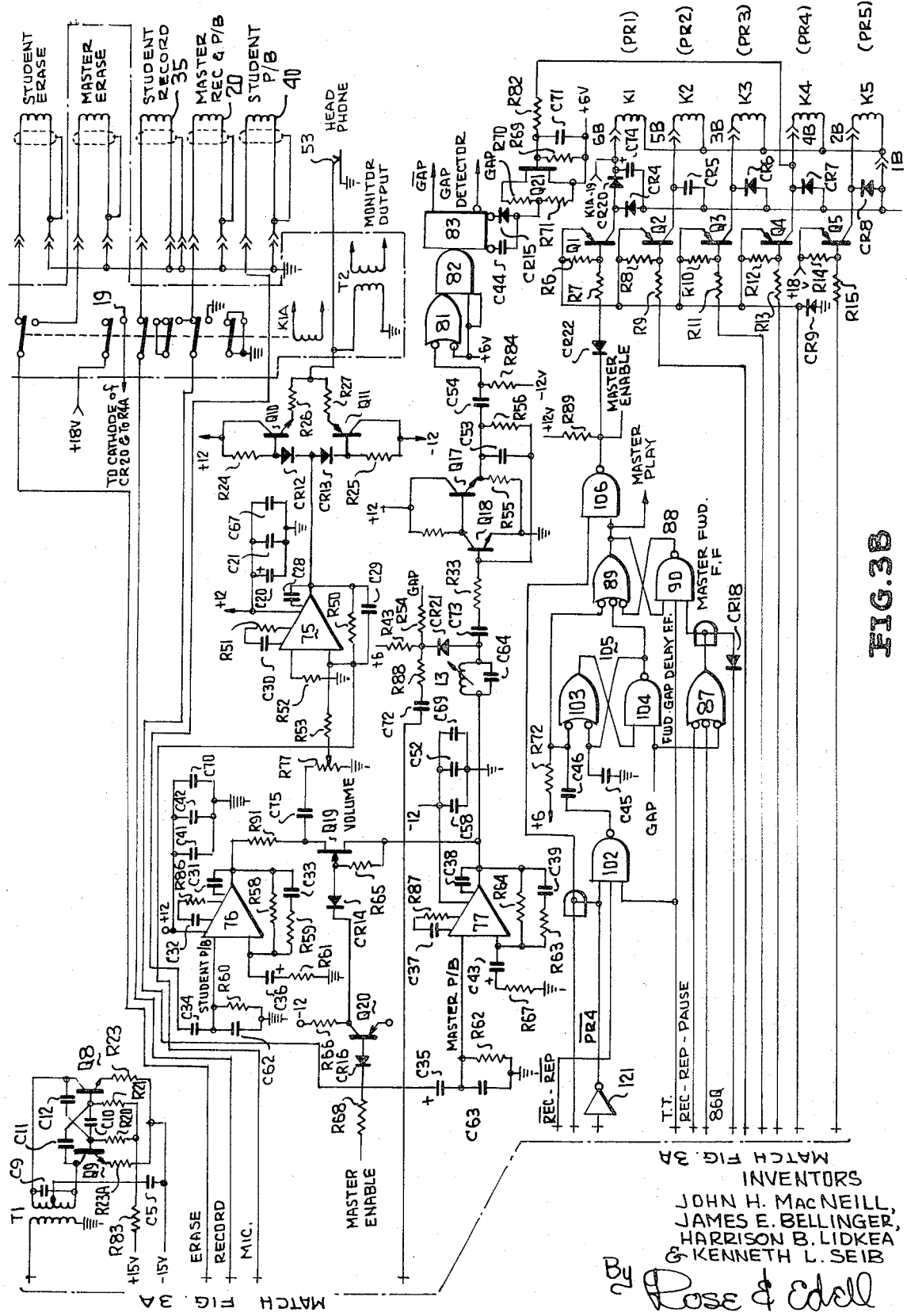

Referring specifically to FIGS. 3a and 3b, solenoids K1 through K5 correspond to the solenoids similarly designated in FIG. 1, each being responsive to current flow through its coil to actuate a respective pinch roller PR-1 through PR-5. Current flow through the coil of each solenoid K1 through K5 is controlled by a respective one of the PNP transistors Q1 through Q5. Taking K1 and PR-1 as illustrative, a positive (binary 1) signal applied to the base of Q1 cuts off Q1 and inhibits current through solenoid K1. A low or binary 0 signal at the base of Q1 causes the latter to conduct and permit actuation of solenoid K1. Each of transistors Q1 through Q5 is normally maintained cut-off by a binary 1 (+18 volts) signal applied to its base. In the case of Q5 this +18 volts is applied to the base directly through resistor R14. In the case of Q1 through Q4 the +18 volts is applied through the normally closed contacts of REW switch 57. Each pinch roller is thus actuated selectively by grounding the base of the appropriate transistor Q1-Q5.

Audio input signals applied to jack 54 are passed through low pass filter L4, C68 and FET switch Q2A to microphone amplifier 74. Switch Q2A is part a remote record optional feature to be described subsequently; for purposes of the present discussion it is assumed that switch Q2A passes audio signals to amplifier 74. In a typical emobdiment amplifier 74 has a gain which ranges between 33 and 60 db, depending on the input signal level, and has a frequency passback from 50 Hz to 10 KHz at the 3 db points. The output signal from amplifier 74 is applied across variable resistor R36 to the record amplifier including circuitry associated with NPN transistors Q13. The output signal from amplifier 74 is also applied via resistor R35 to a summing amplifier which drives the head phones via jack 53. The components associated with the record amplifier Q13 provide both high and low frequency compensation to effect a flat record/playback frequency response between 50 Hz and 10 KHz when driving a Nortonics Corporation Model 7K core head. The record amplifier output signal is passed through normally closed contacts on relay K1A to the student record head 35. Variable inductor L2, in series with the record amplifier output, serves to prevent the bias signal from saturating the record amplifier. An erase oscillator, in the form of an astable multivibrator including transistors Q8 and Q9, provides an A.C. erasure signal for the student tape. The erase signal is applied through another pair of normally closed contacts of relay K1A to the student erase coil 35a at the student record head.

In the remote record mode of operation, relay K1A is energized, thereby opening all of its normally closed contacts and closing the normally open contacts. The record signal in this mode is applied to the master record and playback head 20 to permit the remote input signal to be recorded on the master tape. In addition, +18 volts is applied from pin 19 of relay K1A to the base electrode of transistor Q1A to cut-off both Q1A and Q2A, thereby preventing transfer of signal from jack 54 to microphone amplifier 74. Instead, input signal to amplifier 74 is applied from transformer T2A as received from a remote location.

The +18 volts DC from relay K1A, pin 19, is also applied to solenoid K1 to actuate the master play pinch roller PR-1.

Signals picked up by the student playback head 40 are applied to the student playback amplifier 76 where they are amplified and applied to summing amplifier 75 across volume control resistor R77. The latter is linked to knob 55 on the control panel. The signal picked up by master playback head 20 is applied to master playback amplifier 77 via a pair of normally closed contacts of relay K1A. The output signal from amplifier 77 is also supplied to summing amplifier 75 via an analog switch comprising field effect transistor Q19 whenever the master tape is moving forward. Summing amplifier 75, in turn, drives a push pull amplifier consisting of transistors Q10, Q11, which feeds headphone jack 53. The logic for accomplishing this is described subsequently.

The output signal from amplifier 77 is also applied to a gap detector amplifier including NPN transistors Q17, Q18. The gap detector amplifier output signal is fed to the gap detector comprising OR gate 81, AND gate 82 and retriggerable monostable multivibrator 83.

OR gate 81 is an inverting OR gate, meaning it has two inverting input terminals which effectively convert the OR gate to a NAND gate. One input terminal receives +6 volts; the other receives positive-going signals as long as audio is detected on the master tape. OR gate 81 feeds one input of AND gate 82, the other inputs receive +6 volts. The positive-going output signals of AND gate 82 are employed to trigger monostable multivibrator 83. When the AND gate output goes to binary 1, and remains there, then multivibrator 83 delays approximately one second, as determined by C44 and R71, before switching to its low state (GAP — binary 1). Thus as long as an audio signal is applied to OR gate 81, AND gate 82 triggers multivibrator 83 with positive-going signals and $\overline{GAP}$ remains high. When video disappears from OR gate 81, AND gate 82 is high, and if the audio does not re-appear in one second multivibrator switches to its low state, providing a binary 1 GAP signal and a binary 0 $\overline{GAP}$ signal.

C44 and R71 are the gap detector time determining elements when the master tape is moving forward, at a speed of 3¾ inches per second. When the master tape moves backward it does so at a speed of 7½ inches per second; therefore gaps appear only half as long as they would at the slower tape speed. To compensate for this, signal applied to master reverse solenoid K4 is employed to gate on FET switch Q21, connecting R70 across R71 to half the time constant for the gap detector.

The record flip-flop 86 is employed as a two segment counter for the master tape when the pause switch 61 is depressed. Under these conditions if a phrase has been correctly recorded by the student the master tape will advance through both the verification segment and the following problem or stimulus segment before stopping. Flip-flop 86 is a J-K ranked (master-slave) flip-flop. Normally, terminal $\overline{Q}$ is high and its output signal presented to inverting OR gate 87 does not affect the operation of the master forward flip-flop 88. Master forward flip-flop 88, as described below, includes a three-input inverting OR gate 89 and a three input NAND gate connected in a well-known manner to provide a bistable circuit. However, if record lever 56 is depressed, one input to the two-input inverted OR gate 91 is grounded, actuating two-input AND gate 92 to switch flip-flop 86 to its high state. Assuming that the master play signal (output of the master forward flip-flop) is low, this signal at AND gate 93 causes the output of that gate (the toggle input of flip-flop 86) to be high. At the end of the student record/playback cycle, the master play signal goes high. However, the output of gate 93 also remains high until a recorded segment of the master tape passes the playback head 20. At this time $\overline{GAP}$, which was holding the other input to gate 93 low, goes high causing the output of gate 93 to go low making the $\overline{Q}$ output of flip-flop 86 low. The low level $\overline{Q}$ signal is fed to gate 87, keeping its output high and preventing master forward flip-flop 88 from resetting. At the end of the recorded segment $\overline{GAP}$ goes low allowing the high level Q signal from flip-flop 86 to be entered into AND gate 94 (at this time the signal into gate 92 from gate 91 is low). When a recorded segment again passes under the master playback head (end of the gap), the $\overline{Q}$ of flip-flop 86 goes high, allowing the next-occurring gap to reset master forward flip-flop 88.

PWR switch 51, when actuated, is seen to apply A.C. convenience power to motor M1, power on lamp 52 and to a D.C. power supply 71 via step-down transformer T2. Power supply 71 includes full-wave rectifier 72, a capacitive smoothing filter, and zener diodes CR1, CR2 and CR3 and provides power at various D.C. voltages to the unit. A power on reset circuit includes FET switch Q7, NPN transistor Q6, and an RC charging circuit including capacitor C4 and resistor R17. When power is first turned on, Q7 is rendered conductive as C4 begins to charge. When Q7 is conductive Q6 is rendered conductive and the $\overline{POR}$ signal is grounded (binary 0) to reset the flip-flops described below. When C4 charges sufficiently (in about one-half second), Q7 and Q6 are cut-off and the $\overline{POR}$ signal goes to binary 1.

If, at power turn-on, there is student tape in transient bin 32, taut tape switch 41 is in its normally open condition and a binary 1 signal is applied to two-input NAND gate 73. The second input signal for gate 73 comes from inverter 74 which is connected to RECORD/REPEAT switch 56 and provides a binary 1 to gate 73 if switch 56 is not in its REPEAT position. With both inputs at binary 1, the output of NAND gate 73 is low, driving PNP transistor Q3 into conduction, and actuating solenoid K3. As described in relation to FIG. 1, actuation of solenoid K3 displaces student playback pinch roller PR-3 into engagement with capstan 37 to transfer any loose tape in transient bin 32 into storage bin 31. When transient bin 32 is empty, taut tape switch 41 is actuated, grounding one input to NAND gate 73. The latter responds with a binary 1 output signal to cut-off transistor Q3 and inhibit current through solenoid K3. PR-3 is thus withdrawn from capstan 37 and student tape 30 remains stationary. The sound teacher is now ready for operation in any of the modes outlined above.

The logic circuits of the system and their operation during the various operational modes will be best understood if the logic associated with each pinch roller is individually described. Consequently, the following description treats the actuation circuits for each of pinch rollers PR-1 through PR-5 in turn.

MASTER FORWARD PINCH ROLLER PR-1

A low taut tape signal is inverted by inverter 101 into a high TT signal which is fed to one input of three input NAND gate 102. At this time, if PR-4 is not activated, the $\overline{PR-4}$ input signal to gate 102 is high; and if the record/repeat switch 56 is not actuated the $\overline{REC\cdot REP}$ input signal to gate 102 is also high. Thus the output of gate 102 goes low as soon as TT goes high or in other words as soon as the student tape has been transferred from the transient bin to the storage bin. The negative going edge of the output signal from gate 102 is fed through capacitor C46 to one input terminal of a two input inverting OR gate 103. OR gate 103 and two-input NAND gate 104 are interconnected to provide a bistable element comprising the forward gap delay flip-flop 105. The ngative going edge of the output signal from gate 102 is also fed to one input terminal of a three-input inverting OR gate 89, which as described above comprises part of the master forward flip-flop 88. Thus when NAND gate 102 goes low, both the forward gap delay flip-flop 105 and the master forward flip-flop 88 are set to their binary 1 states causing the output signal from OR gate 89 to go high and thereby provide the master play signal in its binary 1 state. The binary 1 master play signal is applied to a two input NAND gate 106, the other input of which is the $\overline{PR-4}$ signal which is assumed to be in its binary 1 state at this time. The output from NAND gate 106 therefore goes low to provide a binary 0 master enable signal which causes transistor Q1 to conduct and actuate the master play pinch roller PR-1. As described above, this pinch roller causes the master tape to be transported in a forward direction past the master record and playback head 20.

Initially, since the unrecorded part of the master tape (the gap) is passing head 20, the GAP signal is high at OR gate 87. The other input signals to inverting OR gate (NAND gate) 87, including signal 86 $\overline{Q}$ from the record flip-flop and the REP + REC + PAUSE signal from inverting OR gate 107, are also high at this time. Specifically, OR gate 107 receives the $\overline{REP \cdot REC}$ signal and the $\overline{PAUSE}$ signal, and since the pause switch 61 is actuated at this time gate 107 remains high. Since all of its input signals are high, inverting OR gate 187 provides a low output signal which attempts to reset the master forward flip-flop 88. However, the binary 0 output of the forward gap delay flip-flop 105 maintains inverting OR gate 103 in its low state thus assuring that the forward gap flip-flop 105 remains set and that pinch roller PR-1 remains actuated.

When a recorded portion of the master tape passes the master record and playback head 20, the GAP signal goes low forcing inverting OR gate 87 high and the removing the reset signal from NAND gate 90 in the master forward flip-flop 88. In addition, the GAP signal is applied to NAND gate 104 in the forward gap delay flip-flop 105 to reset that flip-flop and provide a binary 1 or high signal from NAND gate 104 to inverting OR gate 89 and the master forward flip-flop 88. Capacitor C45 delays the switching of the forward gap delay flip-flop 105 until inverting OR gate 87 can also be switched by the GAP signal.

Master play pinch roller PR-1 remains operated as long as the recorded signal passes by playback head 20. Approximately one second after the last recorded signal passes the playback head the GAP signal goes high causing inverting OR gate 87 to go low (assuming the other two input signals to gate 87 are also high. This resets the master forward flip-flop and causes controller PR-1 to release.

The input signal applied to inverting OR gate 87 is received from two-input inverting OR gate 107. One of the input signals to gate 107 is received from inverter 108 and is high whenever switch 56 is not actuated (i.e. switch 56 is in neither the record nor repeat mode). The resulting $\overline{REC \cdot REP}$ signal is thus high or binary 1 whenever the record/repeat switch 56 is not actuated. The second input signal to inverting OR gate 107 is the $\overline{PAUSE}$ signal which is binary 1 whenever PAUSE switch 61 is not actuated. Inverting OR gate 107 operates in the manner of a NAND gate since it inverts its input signals so that the output signal from inverting OR gate 107 is binary 1 or high if switch 56 is in the record mode, or if switch 56 is in the repeat mode, or if the PAUSE button is depressed. If none of these actions have been taken or initiated at the control panel, the master play pinch roller PR-1 remains actuated until the next gap in the master tape is sensed at which time the state of gate 107 is once again interrogated at gate 87. The conditions for signal 86 $\overline{Q}$ being in the binary 1 state have been discussed above relative to the record flip-flop 86.

STUDENT RECORD PINCH ROLLER PR-2

If the record/repeat switch 56 is depressed to the record position a binary 0 signal is applied to inverting OR gate 91 causing the output signal from gate 91 to go high rendering NPN transistor Q14 conductive. When Q14 conducts PNP transistor Q2 also conducts and current flows through solenoid K2 to actuate the student record pinch roller PR-2. As described above, when PR-2 is actuated the student tape is fed from the storage bin 31 to the transient bin 32 past the student record head 36. Entry of student tape into transient bin 32 slackens the tape in that bin and allows the taut tape switch 41 to release. Inverter 101 responds by going low to provide a binary 0 TT signal.

Actuation of switch 56 to the record position also renders PNP transistor Q16 conductive to charge capacitor C27 to +6 volts dc. This level renders the N channel FET Q15 conductive to maintain a binary 0 signal at the other input terminal of inverting OR gate 91. When the record/repeat switch 56 is released to its neutral position, capacitor C27 slowly discharges through resistor R46 and resistor R74 towards a −12 volt level. When the discharge has proceeded to a predetermined threshold, for example between −4 and −8 volts, FET Q15 ceases to conduct and the corresponding input terminal of inverting OR gate 91 receives a binary 1 signal. Since the switch 56 has been released, both input signals to gate 91 are high so that its ouptut goes to binary 0, cutting off transistors Q14 and Q2 and inhibiting current flow through solenoid K2. As described above, this releases the student record pinch roller PR-2 and terminates transfer of student tape 30 into the transient bin 32. Importantly, however, it is to be noted that pinch roller PR-2 is held energized after the record lever is released for a period of time determined by the discharge time constant for capacitor C27 through resistors R46 and R74. This time constant is adjusted to permit a length of student tape, equal to the distance between the student record and playback heads, to be fed into the transient bin, thus insuring that all of the recorded message by the student passes into the transient bin. As a consequence, when the student tape is played back all of the student's recorded message is passed by the student playback head 40 before taut tape switch 41 is actuated.

STUDENT PLAYBACK PINCH ROLLER PR-3

Following the sequence from the previous paragraph, upon release of the record/repeat switch 56, both input signals to NAND gate 73 go high (or to binary 1). Specifically, since there is tape in transient bin 32 the taut tape switch 41 is in its tape position so that a +6 volts signal is applied to NAND gate 73. Likewise, since the record/repeat switch 56 is in its neutral or horizontal position a binary 0 signal is applied to inverter 108 which in turn applies a binary 1 $\overline{REC \cdot REP}$ signal to NAND gate 73. NAND gate 73 therefore provides a binary 0 output signal to render transistor Q3 conductive and permit passage of current through solenoid K3. As described above, actuation of K3 results in actuation of the student playback pinch roller PR-3 to cause transfer of tape from the transient bin 32 to the storage bin 31. Importantly, it is to be noted that immediately upon termination of recording by the student, the recorded portion of student tape 30 is automatically returned to the storage bin past the student playback head 40.

When all of the recorded portion of student tape 30 has been transferred out of the transient bin 32, the tape actuates the taut tape switch 41 to apply a binary "0" signal to one of the input terminals of NAND gate 73. Gate 73 is thereby caused to provide a binary 1 output signal to cut-off transistor Q3 and thereby deactuate the student playback pinch roller PR-3.

MASTER REVERSE PINCH ROLLER PR-4

The master reverse pinch roller PR-4, is actuated whenever the record/repeat switch 56 is depressed to the record position during mode 1, or when the record/repeat switch is elevated to the repeat position in any mode and there is no student tape in transient bin 32. These conditions are described in detail below.

If the mode 1 button is depressed, the input signal to inverter 74 is binary 0 and the output signal from inverter 74 attempts to go to binary 1. However, the output signal from inverter 74 is prevented from going high by the path to ground through CR23 and the record/repeat switch 56 is in its neutral position. If switch 56 is either depressed or elevated, to its record or repeat positions respectively, this ground path is removed allowing the output signal from inverter 74 to go to binary 1. If such is the case the binary 1 signal is fed to an input terminal of two-input NAND gate 111, the other input signal to which is the TT signal from inverter 101 which is binary 1 if there is no tape in the transient bin 32. Assuming mode 1 operation, if the record/repeat switch 56 is depressed to the record position, the binary 1 output signal from inverter 74 is applied to NAND gate 111. With both input signals to NAND gate 111 at the binary 1 level, the output signal from that gate goes to binary 0 and is employed to set both the reverse gap delay flip-flop 112 and the master reverse flip-flop 113. In addition, since student tape 30 is fed into transient bin 32 when switch 56 is depressed to the record position, after a few milliseconds, the tape switch 41 is released and removes the ground from the input signal to inverter 101 to provide a binary 0 TT signal to NAND gate 111. In this manner, multiple depressions of the record lever will cause only one cycle of PR-4 operation until the transient bin is emptied. Specifically, the reverse gap delay flip-flop 112 comprises a two-input inverting OR gate 114 and a three-input NAND gate 115 connected as a bistable circuit; the master reverse flip-flop comprises a three-input inverting OR gate 116 and a two-input NAND gate 117 also connected as a bistable circuit. The output signal from NAND gate 111 is delivered as an input signal to each of inverting OR gates 114 and 116. With both flip-flops set by the output signal from NAND gate 111, the binary 1 output signal from inverting OR gate 116 is inverted to binary 0 by one-input NAND gate 118, which in turn renders transistor Q4 conductive and permit current flow through solenoid K4. This, as described above, causes the master reverse pitch roller PR-4 to be actuated and cause the master tape to move backward onto the storage reel 12. When pulled backward onto the storage reel it is important to note that the master tape is pulled across the master record/playback head 20, so that recording gaps in the master tape 10 can be sensed.

The binary 1 output signal from the set master reverse flip-flop 113 is designated PR-4 and is applied to an inverter applied to an inverter 121. The resulting binary 0 $\overline{PR-4}$ signal from inverter 121 is applied to NAND gate 102 and NAND gate 106 to assure that transistor Q1 remains cut-off and that the master forward pinch roller PR-1 is deactivated. The master reverse pinch roller PR-4 remains actuated until a gap is detected in the master tape. This is assured by applying the binary 0 output signal from NAND gate 115 in the set reverse gap delay flip-flop 112 to one input terminal of inverting OR gate 116 in the master reverse flip-flop 113. Specifically, if the output signal from NAND gate 111 goes to binary 1 before the recorded segment on master tape 10 passes completely by head 20, the binary 0 $\overline{GAP}$ signal applied to NAND gate 117 would try to reset the master reverse flip-flop 113 and thereby deactuate pinch roller PR-4. However, the binary 0 output signal from NAND gate 115 applied to inverting OR gate 116 assures that the master reverse flip-flop cannot be reset at this time. When the recorded portion of the tape is detected by the gap detector circuitry the GAP signal goes low and the $\overline{GAP}$ signal goes high. The low GAP signal is applied to NAND gate 115 and sets the reverse gap delay flip-flop 112; however, the binary 1 $\overline{GAP}$ signal can no longer reset the master reverse flip-flop 113. Capacitor C47 connected to an input terminal of inverting OR gate 114 delays the removal of the binary 0 output signal of NAND gate 115 from the input terminal of inverting OR gate 114 until the $\overline{GAP}$ signal has risen to its binary 1 state. Approximately 0.4 seconds after the last recorded signal passes the master playback head, the $\overline{GAP}$ signal goes low and resets the master reverse flip-flop to release the pinch roller PR-4.

Still assuming a mode 1 operation, it is to be noted that if the record/repeat switch 56 is elevated to the repeat position the input terminal to inverter 74 is grounded by both the mode 1 switch and the record/repeat switch. The output signal from inverter 74 is forced to binary 1, and no ground path through CR23 and switch 56 prevents this action. Consequently, a binary 1 signal is applied to NAND gate 111 for as long as the record/repeat switch is held in the repeat position. As described above, with both input signals to NAND gate 111 being in the binary 1 state the output signal from the NAND gate is binary 0 and sets both the reverse gap delay flip-flop 112 and the master reverse flip-flop 113. Neither of these flip-flops can be reset by the gap detector as long as the record/repeat switch 56 is held in the repeat mode. Once the record/repeat switch 56 is released to its neutral position operation proceeds as described above with the next detected recording in the master tape functioning to reset the reverse gap delay flip-flop and the next following detected gap functioning to reset the master reverse flip-flop to deactuate the master reverse pinch roller PR-4. It is to be noted that actuation of the record/repeat switch 56 to its repeat position functions as described in this paragraph regardless of which of the three mode switches is depressed because of the grounding of the input terminal to inverter 74 by switch 56 in its repeat position.

The three mode push buttons are interlocked so that only one can be depressed at a time. If the mode two or three button is depressed, the mode one push button is deactuated and removes the ground signal from the input terminal of inverter 74. The output signal from inverter 74 goes to binary 0 and thereby maintains NAND gate 111 in its binary 1 state preventing setting of the reverse gap delay flip-flop 112 and the master reverse flip-flop 113. These flip-flops can be set by NAND gate 111 in modes two and three only by actuation of the record/repeat switch 56 to the repeat position.

It will be appreciated from the foregoing description that in mode one the master tape reverses through only one recorded segment when the record/repeat switch 56 is actuated to the record position. On the other hand, actuation of the record/repeat switch to its repeat position in any mode causes the master tape 10 to reverse until a gap is detected after release of switch 56.

REWIND PINCH ROLLER PR-5

The rewind pinch roller PR-5 is uder the control of the rewind push button 57 and the end-of-tape sensor switch 122. When the rewind push button is depressed +18 volts dc is removed from the emitters of transistors Q1, Q2, Q3 and Q4 to inhibit actuation of pinch rollers PR-1, PR-2, PR-3, and PR-4. In addition, actuation of the rewind switch 57 provides a negative going pulse to the end-of-tape flip-flop 125 which includes a pair of inverters 126 and 127 connected in bistable circuit arrangement. The negative going pulse is applied by an ac coupling capacitor C40 to the input terminal of inverter 126 to set flip-flop 125 and provide a binary 1 output signal from inverter 126 which is applied to a two-input NAND gate 128. The other input signal to NAND gate 128 is +6 volts when the rewind switch is actuated and grounded when the rewind switch is not actuated. With both input signals to NAND gate 128 at a binary 1 level the ouptut signal of that gate is binary 0 and renders transistor Q5 conductive. When transistor Q5 conducts, solenoid K5 is conductive and activates the rewind pinch roller PR-5. A high speed rewind of master tape 10 continues until the rewind push button is released grounding the upper input to NAND gate 128 which now provides a binary 1 output signal to cut-off current flow through transistor Q5 and solenoid K5.

Termination of the fast rewind of the master tape is also achieved automatically by the end of tape sensor. Specifically the end of tape sensor, designated schematically by switch 122 in FIG. 3a, comprises a pair of conductive metal posts arranged to be spanned by a metal strip or foil secured to the end of the tape. When the tape reaches the end these posts are shorted to provide a ground signal at the input terminal of inverter 127. This resets the end of tape flip-flop and causes pinch roller PR-5 to release.

It is to be noted that when the rewind switch is actuated, a ground signal is applied to one input terminal of NAND gate 90 in the master forward flip-flop 88. This causes a resetting of flip-flop 88 to insure that the master playback amplifier 77 is disconnected from headphone amplifier 75 during rewind. This is achieved by means of the binary 0 output signal from inverting OR gate 89 which in turn provides a binary 1 master enable output signal fron NAND gate 106. This signal is applied to the base of transistor Q20 to cut-off the latter and provide a negative signal at the gate electrode of FET Q19. Q19 is thus open and the output signal from the master playback amplifier 77 is prevented from reaching the summing amplifier 75.

The mode three push button switch when actuated applies a ground signal to an input terminal of AND gate 92. This maintains the record flip-flop 86 in its reset state to assure that the master, when being transported forward, stops at every detected gap of 1 second or greater. This is in contradistinction to mode one and mode two operation where the master tape is stopped only upon detection of alternate gaps.

The importance of the pause switch 61 may be appreciated at this time. If the pause switch is actuated a ground signal is applied to one input terminal of inverting OR gate 107. As long as that ground signal is present at the input to OR gate 107 the output signal from that gate is binary 1, which permits inverting OR gate 87 to change state in accordance with its other logic input signals, including the gap detector. Thus the master forward flip-flop 88 can be energized or deenergized in accordance with the gap detector logic described above. However when the pause switch is not depressed a +6 volt $\overline{PAUSE}$ signal is applied to inverting OR gate 107 which responds by providing a binary 0 output signal unless the record/repeat switch 56 is in the repeat or record mode. This binary 0 output signal is applied to inverting OR gate 87 to maintain the latter in its binary 1 state regardless of the gap detection logic conditions. It is seen therefore that the pause switch provides the sutdent with the option of operating with no automatic stopping of the master tape after each master segment is played (similar to the operation of the aformentioned Cooper machine) or to automatically stop the master tape after one or two master segments have been played in accordance with the selected operational mode.

The distinguishing features of the three modes may now be more clearly understood. Mode one for example is primarily ntended for exercises in which the sutdent repeats the message recorded in the master tape segment and then hears his own recording and a repeat of the master tape segment. Specifically, if segment A of the master tape is played, the master tape automaticallly stops, assuming the pause switch is depressed. The student then depresses the record/repeat switch 56 and records his version of the segment A message. While he is recording his version the master tape is caused to move in the reverse direction until it reaches the gap preceding segment A at which point the master tape stops once again. Upon termination of his recording the student releases the record/repeat switch 56 to its netural position and automatically hears his recording. When the sutdent recording is completely played back, the master tape is once again moved forward and segment A is repeated. When segment A is finished this time however the master tape does not automatically stop but instead it continues on to segment B which is assumed for this mode to be the next portion of the lesson. The student can manually prevent the tape from proceeding to segment B by depressing the record/repeat switch 56 to the record mode after segment A has been repeated. This will permit the student to record his version of segment A again which will be followed by the playback of his recording and the subsequent repeat of segment A from the master tape. In this manner the student can manually repeat segment A in mode one as many times as he wishes.

Mode two is intended for repetitive drill lessons. Specifically the student listens to segment A as played from the master tape. Segment A in this mode is assumed to be a question of some sort which the student might anser. Assuming the pause switch to be depressed, the master tape stops when segment A is completed and the studend may then think about his answer without worrying about the master tape preoceeding to segment B. When the student has determined his answer he depresses the record/repeat switch to the record position and enters his answer onto the student tape 30. The master tape remains stationary during this period. Upon completion of his recording the student immediately hears his answer played back and his answer is followed by segment B as played from the master tape. In this case segment B contains the answer to the question appearing in segment A and should of course be the same as the answer recorded by the student. Upon completion of segment B the tape automatically continues past the gap between segments B and C and plays back segment C which would be the next question for the student to answer. The tape stops after segment C and the student once again can record his answer and proceed as described above.

Mode three is also intended for problem drills but unlike mode two, each master tape segment is assuemd to contain no gaps between each recorded answer and the next succeeding recorded question on the master ape. Specifically, the student hears the question in segment A and the tape automatically stops, assuming the pause switch to have been depressed. The student then thinks out his answer and when sure of it depresses the record/repeat switch 56 and enters his answer on the student tape 30. Again the master tape remains stationary at this time. When the student finishes entering his answer on the student tape the student tape plays back his answer. Upon completion of student playback the master tape proceeds forward and plays back its recorded answer which comprises the part of segment B in the master tape. There being no gap between the answer contained in segment B and the next question also contained in segment B, the master tape continues on and plays back the next question. Upon completion of segment B the master tape is automatically stopped and the student is able to record his answer to the question contained in the latter part of segment B. Operation then continues in the manner previously described.

Figure 4:
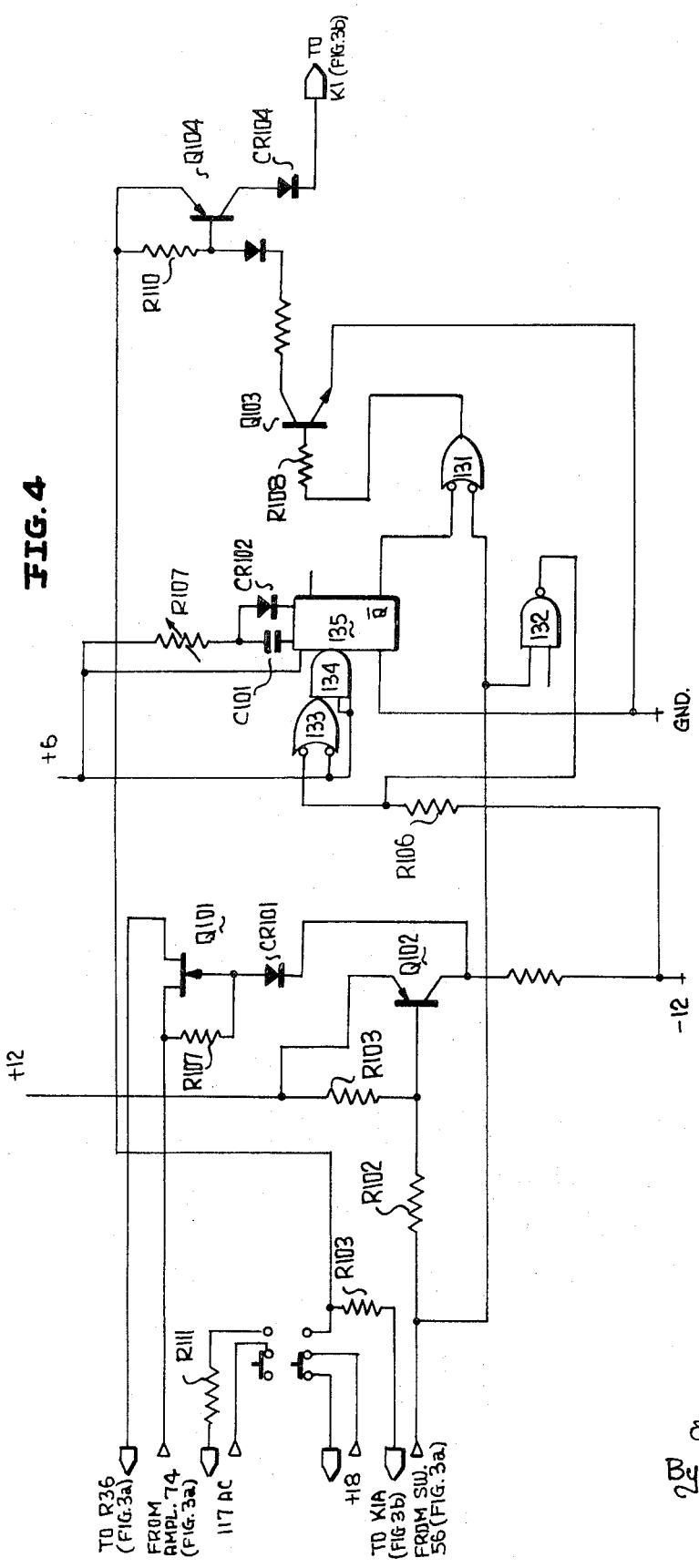
FIG. 4 is a schematic diagram illustrating control circuitry for an optional feature capable of utilization with the preferred embodiment of the present invention.

The local record feature of the present invention, which is preferably an option and need not be utilized with each machine, is illustrated in FIG. 4. In particular, the record switch 58 when actuated applies +18 volts dc across relay K1A in FIG. 3b by a resistor R103 in FIG. 4. By actuating relay K1A the master record and playback head 20 in FIG. 3b is connected to receive audio output signals from the record amplifier Q13 in FIG. 3a. In addition the actuation of record switch 58 applies 117 volts ac across the record indicator lamp 59 in FIG. 2. In addition a +18 volt bias signal is applied by record switch 58 to the emitter of transistor Q104 in FIG. 4.

Upon actuation of record switch 58 the operator is now free to record on the master tape by depressing the record/repeat switch 56 of FIG. 3a. More specifically depression of switch 56 provides a ground signal to the base of transistor Q102 in FIG. 4 which renders Q102 conductive and applies a positive bias to the cathode of diode CR101 in the gate circuit of FET Q101. (For purposes of the circuit of FIG. 4 it is assumed that switch Q101 is inserted in series between the output terminal of amplifier 74 and resistor R36 in FIG. 3a). This opens the gate comprising Q101 and permits the output signal from microphone amplifier 74 in FIG. 3a to be applied through gate Q101 to the record adjust potentiometer R36 of FIG. 3a from which it is applied to the record amplifier Q13. As described above, the output of record amplifier Q13 is in this mode applied directly to the master tape record head 20 of FIG. 3b.

The remainder of the circuit of FIG. 4 is concerned with providing a proper length gap between segments recorded on the master tape. As long as the record/repeat switch 56 is depressed, sounds picked up by the microphone are amplified to the appropriate level and recorded on the master tape 10. Whenever the record switch is released the record amplifier is muted and a controlled one second gap is produced on the master tape. To achieve this operation the ground received from the record/repeat switch 56 in FIG. 3a is applied as an input signal to a two input inverting OR gate 131 and to a one input NAND gate 132. The positive output from OR gate 131 is applied to the base of Q103 rendering the latter conductive and thereby rendering Q104 conductive and current is supplied to solenoid K1 in FIG. 3b to activate master play pinch roller PR-1.

When the student releases the record/repeat switch 56 to the neutral position the ground input signal is removed from NAND gate 132 and from inverting OR gate 131. Gate 131 still is maintained in the binary 1 state by the binary 0 $\bar{Q}$ output signal from multivibrator 135. Since NAND gate 132 changes to the binary 0 state when switch 56 is released it triggers multivibrator 135 via gates 133 and 134. The output signal from AND gate 134 triggers multivibrator 135 in the same manner described in relation to gap detector circuitry in FIG. 3b. The time delay associated with multivibrator 135 by means of resistor R107 and capacitor C101 prevent switching of multivibrator 135 for one second after switch 56 has been released. Therefore the binary 0 signal from multivibrator Q135 does not change to binary 1 for one second and is thereby effective to maintain the pinch roller PR-1 activated for one second after release of switch 56.

During normal local-record operation, the last phrase recorded may be redone by switching the machine to normal operation and listening to the lesson tape and, with the PAUSE button depressed, allowing the machine to stop automatically after locating the word or phrase preceding the one to be rerecorded. The machine is then switched to LOCAL RECORD and, to eliminate clicks on the tape, the lesson tape is manually backed up 1 inch and then moved forward 2 inches. Recording of the lesson tape may now continue through operation of the record lever. After the lesson tape is completed a final edit is recommended with the pause button depressed and the proper MODE selected. If a word or phrase in the lesson must be reworked, record the word or phrase on another reel of tape and splice it into the original lesson tape. Again, with the PAUSE button depressed the machine automatically stops before and after the word or phrase, permitting marking of the phrase to be replaced for splicing. A contrasting felt pen or chip of splicing tape will easily mark the back side of the tape for such editing.

The local record mode can be further modified by including means for sensing audio input and automatically deactivating pinch roller PR-1 when the operator pauses without releasing record/repeat switch 56 to neutral. Such operation automatically eliminates unintended gaps in the instruction that would otherwise be provided when the operator stops to think. Effectuation of this feature is done simply by employing an audio detector to sense input audio passed through switch Q101. A retriggerable multivibrator, of the same type employed for the gap detector, would then be maintained in one state for as long as input audio is present and for approximately 0.7 seconds thereafter. (This after-period must be shorter than the detectable 1 second gap period employed for control purposes in the system). Whenever the retriggerable multivibrator is in its other state it would be connected to cut-off transistor Q103 and deactuate PR-1.

The gapping machine may be operated in conjunction with a companion modified stereo recorder of the type which uses separate record-playback heads of interchangeable physical size. When used with the Gapping Sound Teacher, the record head of the stereo recorder is replaced with a second playback head. The second stereo playback amplifier is connected to the appropriate channel of the newly installed second playback head. The configuration permits the monaural playback of a tape with audio from one of the stereo amplifiers delayed with respect to the audio from the other. The two audio signals are fed to the Gapping Sound Teacher through a special connector (not shown). The gapping machine uses the early audio to automatically start and stop the transport of the reel-to-reel instruction tape in the Sound Teacher. When more than a second has passed since receipt of a signal, the gapping machine interrupts recording and tape transport. When signals are again detected in the early audio channel, the tape again is set in motion. By recording the latter of the two audio signals, adequate time is available to accelerate the tape to full speed before receipt of the signals to be recorded.

The gapping machine, unattended, records a master tape at 3¾ inches per second reducing all detected gaps to 0.7 second duration. Gaps of more than 0.7 second duration are often observed in introductory and explanatory statements in most lesson tapes. Operation of the STOP/ADV switch 60 alters the gapping machine control circuits to shorten such gaps until they no longer actuate the Sound Teacher control circuits. Thus the STOP/ADV momentary action switch should be depressed during regapping of those portions of the tape in which automatic pauses would provide confusion. With the STOP/ADV switch in the out position, gaps appreciably longer than one second are reduced only to the extent that the control circuits of the Sound Teacher are still reliably activated; that is, gaps are shortened but not removed. To prevent accidental erasing of a tape, the Sound Teacher can not initiate rewind upon operation of the REW switch 57 until the gapping circuits have been turned off.

The Intercom-Remote Record features allow a group of Sound Teachers to be electrically interconnected with a classroom control console. In this configuration, any student in a classroom may be monitored without his knowledge and without interrupting his activities. In addition, with a proper console distribution system, instruction and aid may be given to any one or all students via the intercom inputs.

The remote record feature permits a new lesson to be recorded on an entire set of macines simultaneously. To utilize this feature end-of-tape (EOT) sensing of a metallic leader (e.g. Ampex C-21674 or equal) must be used and each student is required to actuate his REW switch 57 at the end of the lesson period and leave the PWR switch 51 "on". With the tape on all machines rewound, the old lesson material on the tapes now may be erased from the instructor's console and new lesson material recorded on those recorders the instructor selects. This is accomplished by energizing remote record relay K1A in each Sound Teacher selected, and feeding the desired audio signal to the intercom inputs T3 of these machines (bias is supplied by each of the individual machines). Energizing local record relay K1A, as described above, mutes the local microphone, so that noises in the classroom are not recorded, in addition, K1A initiates forward tape transport so as to record whatever signal is on the intercom input on the instruction reel of tape. At the end of the recording, the instructor should deenergize the remote record relays. The REW button 57 on each machine must be released and again depressed to rewind the newly recorded lesson material.

While we have described and illustrated one specific embodiment of our invention, it will be clear that variations of the details of construction which are specifically illustrated and described may be resorted to without departing from the true spirit and scope of the invention as defined in the appended claims.

What is claimed is:

1. A tape recording system comprising:
   a master tape having recorded thereon a plurality of items, successive items being separated by a gap of predetermined length;
   an endless student tape;
   a storage device for said master tape;
   a take up device for said master tape;
   a storage bin for said student tape;
   a transient bin for said student tape;
   means for at will reading out an item from said master tape while transferring a length of said master tape from said storage device to said take up device;
   a gap detector for monitoring items read out from said master tape and detecting a gap between successive items;
   manually actuable means having first and second conditions;
   circuit means responsive to a detection of a gap when said manually actuable means is in said first condition for stopping said master tape, and responsive to said manually actuable means in said second condition to inhibit stopping said master tape in response to gap detection;
   means for at will recording an item on said student tape; and
   means for automatically reading out an item recorded on said student tape immediately upon completion of recording that item.

2. The tape recording system according to claim 1 further comprising plural mode selection means including first means actuable in a first system mode for transferring said length of said master tape from said take up device to said storage device during recording of an item on said student tape, and means for automatically reading out the recorded item on said length of master tape after the item recorded on said student tape is automatically read out.

3. The tape recording system according to claim 1 further comprising means for at will recording items on said master tape, and actuable switch means for automatically inserting gaps of at least said predetermined length between items thus recorded on said master tape.

4. The tape recording system according to claim 1 comprising momentarily actuable means to effect transfer of a complete recorded item from said take up device to said storage device for said master tape.

5. A tape recording system comprising:
   a master tape having information signal recorded thereon in the form of a plurality of information items, successive items being separated by a gap of predetermined length in said information signal;
   an endless student tape;
   a storage device for said master tape;
   a take-up device for said master tape;
   a storage location for said student tape;
   a normally empty transient bin for said student tape;
   means for initiating transfer of master tape from said storage device to said take up device at predetermined speed while reading out information signal recorded on the transferred tape;
   a gap detector for monitoring the information signal read out from said master tape and providing a control signal upon detecting a gap of at least said predetermined length between information items in the information signal being read out;
   manually actuable switch means having first and second positions;
   circuit means responsive to said switch means in said first position and the simultaneous presence of said control signal for terminating transfer of said master tape from said storage device to said take up device, and responsive to said switch means in said second position to continue said transfer of said master irrespective of said control signal;
   means for at will recording an item on said student tape and transferring the tape containing that item to said transient bin from said storage location; and
   means for reading out an item recorded on said student tape immediately after that item is recorded and transferring the student tape as it is read out back to said storage location from said transient bin.

6. The system according to claim 5 wherein said circuit means additionally includes means responsive to said switch means in said first position and simultaneous presence of said control signal for initiating a reverse transfer of said master tape from said take-up device to said storage device wherein said gap detector includes means for providing said control signal upon detecting a gap of at least said pre-determined length in said information signal during reverse transfer of said master tape, and wherein said circuit means further includes means responsive to the presence of said control signal during reverse transfer of said master tape for terminating said reverse transfer.

7. The system according to claim 6 wherein said circuit means further includes means responsive to the absence of student tape from said transient bin combined with the master tape in a state of rest following a reverse transfer for initiating a forward transfer of said master tape from said storage device to said take-up device while reading out information signal recorded on the transferred tape.

8. The system according to claim 7 wherein said circuit means further comprises means responsive to a reverse transfer of a single master tape item followed by a forward transfer of that master tape item for inhibiting the effect of said control signal upon detection of the gap following that master tape item such that the forward transfer is permitted to continue and the next master tape item is read out.

9. The system according to claim 5 wherein said circuit means further comprises means responsive to the termination of student tape transfer from said transient bin to said storage location and the resulting absence of student tape from said transient bin for re-initiating transfer of said master tape from said storage device to said take-up device.

10. The system according to claim 5 further comprising:
    first selectively actuable means for recording items of input information signal on said master tape while transferring said master tape to said take-up device;
    second selectively actuable means operable during recording of signal on said master tape for inserting gaps of at least said predetermined length between items of information signal being recorded on said master tape; and
    means operable during recording of signal on said master tape for automatically stopping said tape in response to a pause of predetermined duration in said input signal in the absence of actuation of said second selectively actuable means, said pause of predetermined duration corresponding to a length on said master tape which is shorter than said gap of predetermined length.

11. The system according to claim 5 further comprising:
    a plurality of mode-selection switches arranged to be actuated one at a time;
    further means responsive to said mode selection switches for effectuating system operational modes corresponding to the actuated mode-selection switch, said further circuit means comprising:
    first mode control means responsive to actuation of a first of said mode-selection switches for controlling said circuit means to terminate all transfers of said master tape between said storage device and said take-up device whenever said control signal is present and said manually actuable means is in said first position; and
    second mode control means responsive to actuation of a second of said mode-selection switches for controlling said circuit means to count the number of times said control signal is generated while said manually actuable means is in said first position, said second control means including means for terminating forward transfer of said master tape from said storage device to said take-up device only in response to alternate generations of said control signal while said manually actuable means is in said first position.

12. A magnetic tape machine for teaching a student operator, said machine being of the type which includes a master tape upon which spaced audio lesson segments are recorded, a storage device for said master tape, a take-up device for said master tape, means for transferring said master tape in both directions between said storage and take-up devices, means for playing back the lesson segments recorded on said master tape during forward transfer of said master tape from said storage device to said take-up device, an endless student tape, a storage bin normally storing said student tape, a transient bin for said student tape, operator-actuable student record control means for transferring a portion of student tape from said storage bin to said transient bin while recording operator-initiated sounds thereon, and means responsive to termination of a transfer of a portion of said student tape into said transient bin for automatically transferring that portion of said student tape back into said storage bin while playing back the sounds recorded thereon, said machine being characterized by:
- a first actuable pause control switch;
- a gap detector for detecting the presence of a gap of predetermined length between lesson segments on a portion of master tape being transferred; and
- pause control means for automatically terminating forward transfer of said master tape upon detection of a predetermined number of said gaps of predetermined length while said pause control switch is actuated.

13. The machine according to claim 12 further characterized by at least two distinct operational modes; in a first of said modes successive lesson segments being spaced by a gap of at least said predetermined length and intended to be repeated by a student on said student tape; in a second mode said lesson segments comprising a series of alternating questions and answers, each answer being spaced from the preceding and following questions by a gap of at least said predetermined length; said system including:
  first actuable mode selection means for operating said system in said first mode, said first mode selection means comprising:
    first circuit means for transferring while playing back a length of said master tape corresponding to one lesson segment from said storage device to said take-up device, said first circuit means being operatively connected with said pause control means to automatically terminate transfer of said master tape after said one lesson has been transferred;
    means for reverse-transferring the length of said master tape corresponding to said one recorded lesson segment back to said storage device from said take-up device in response to actuation of said student record control means;
    means responsive to transfer of student tape into said transient bin and the subsequent transfer of student tape out of said transient bin for re-transferring while playing back the previously reverse-transferred length of master tape corresponding to said one lesson segment; and
    means for inhibiting said pause control means to prevent automatic termination of transfer of said re-transferred length of tape, corresponding to said one lesson segment, upon detection of a gap of said predetermined length between said one lesson segment and the next succeeding lesson segment;
  second actuable mode selection means for operating said system in said second mode, said second actuable mode selection means being actuable alternatively to said first mode selection means and comprising:
    means for operating said first circuit means and said pause control means to transfer and playback a length of said master tape corresponding to a question lesson segment and terminating transfer upon completion of playback of said question; and
    means responsive to transfer of student tape into said transient bin and the subsequent transfer of student tape out of said transient bin for transferring and playing back a length of said master tape corresponding to the answer following said question.

14. The machine according to claim 12 further characterized by at least two distinct operational modes; in a first of said modes successive lesson segments being spaced by a gap of at least said predetermined length and intended to be repeated by a student on said student tape; in a second mode said lesson segments comprising a series of alternating questions and answers, each answer being spaced from the preceding question by a gap of at least said predetermined length and being followed by the next question without a gap of said predetermined length, said system including:
  first actuable mode selection means for operating said system in said first mode, said first mode selection means comprising:
    first circuit means for transferring while playing back a length of said master tape corresponding to one lesson segment from said storage device to said take-up device, said first circuit means being operatively connected with said pause control means to automatically terminate transfer of said master tape after said one lesson has been transferred;
    means for reverse-transferring the length of said master tape corresponding to said one recorded lesson segment back to said storage device from said take-up device in response to actuation of said student record control means;
    means responsive to transfer of student tape into said transient bin and the subsequent transfer of student tape out of said transient bin for re-transferring while playing back the previously reverse-transferred length of master tape corresponding to said one lesson segment; and
    means for inhibiting said pause control means to prevent automatic termination of transfer of said re-transferred length of tape, corresponding to said one lesson segment, upon detection of a gap of said predetermined length between said one lesson segment and the next succeeding lesson segment;
  second actuable mode selection means for operating said system in said second mode, said second actuable mode selection means being actuable alternatively to said first mode selection means and comprising:
    means for operating said first circuit means and said pause control means to transfer and playback a length of said master tape corresponding to a question lesson segment and terminating transfer upon completion of playback of said question; and
    means responsive to transfer of student tape into said transient bin and the subsequent transfer of student tape out of said transient bin for transferring and playing back a length of said master tape corresponding to the answer following said question.

15. The machine according to claim 12 further characterized by at least one operational mode in which successive lesson segments are spaced by a gap of at least said predetermined length and are intended to be repeated by a student on said student tape, said system including:
- actuable mode selection means for operating said system in said operational mode, said mode selection means comprising:
  - first circuit means for transferring while playing back a length of said master tape corresponding to one lesson segment from said storage device to said take-up device, said first circuit means being operatively connected with said pause control means to automatically terminate transfer of said master tape after said one lesson segment has been transferred;
  - means for reverse-transferring the length of said master tape corresponding to said one recorded lesson segment back to said storage device from said take-up device in response to actuation of said student record control means;
  - means for selectively transferring student tape into said transient bin and enabling recording by the student on the tape being transferred into said transient bin; and
  - means responsive to termination of transfer of student tape into said transient bin for automatically playing back in succession said one recorded lesson segment and the student recording on the tape in said transient bin.

16. A magnetic tape teaching machine of the type wherein a master tape has a plurality of lesson segments recorded thereon, said message segments being spaced by a gap of at least a predetermined length, said machine being characterized by:
- first selectively actuable means for recording said lesson segments in the form of input information signal onto said master tape while transferring said tape along a prescribed path at predetermined speed;
- second selectively actuable means for inserting said gaps of predetermined length between lesson segments, said second selectively actuable means comprising means for selectively transferring at least said predetermined length of said master tape along said prescribed path while inhibiting recording on the transferred predetermined length of master tape;

and further comprising:
- means operable during recording of input signal onto said master tape in the absence of actuation of said second selectively actuable means and responsive to pauses of predetermined time duration in said input signal for temporarily terminating transfer of said master tape until the input signal is restored, the product of said predetermined time duration and said predetermined speed being less than said gap of predetermined length.

* * * * *